Jan. 4, 1927.

T. C. PORTER 1,613,568

CUTTING TOOL

Filed Sept. 10 1925

Inventor:
Tyler C. Porter,
by Emery, Booth, Janney & Varney
Attys

Patented Jan. 4, 1927.

1,613,568

UNITED STATES PATENT OFFICE.

TYLER C. PORTER, OF BROOKLINE, MASSACHUSETTS, ASSIGNOR TO H. K. PORTER, INC., OF EVERETT, MASSACHUSETTS, A CORPORATION OF MASSACHUSETTS.

CUTTING TOOL.

Application filed September 10, 1925. Serial No. 55,511.

This invention aims to provide a simple, durable and powerful cutting tool particularly adapted for cutting metal.

Figure 1:
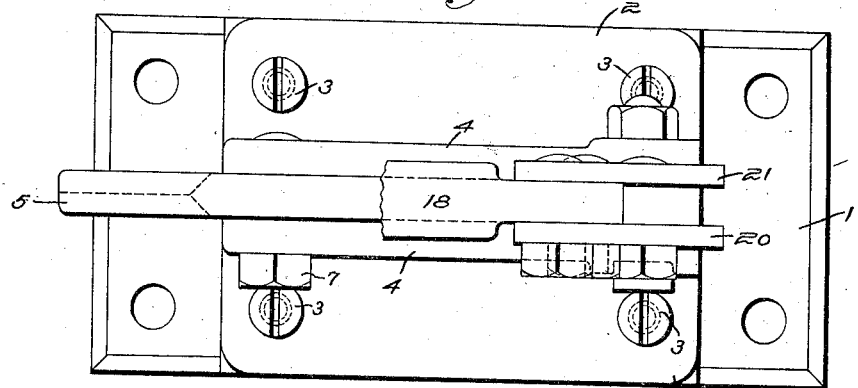
Figure 2:
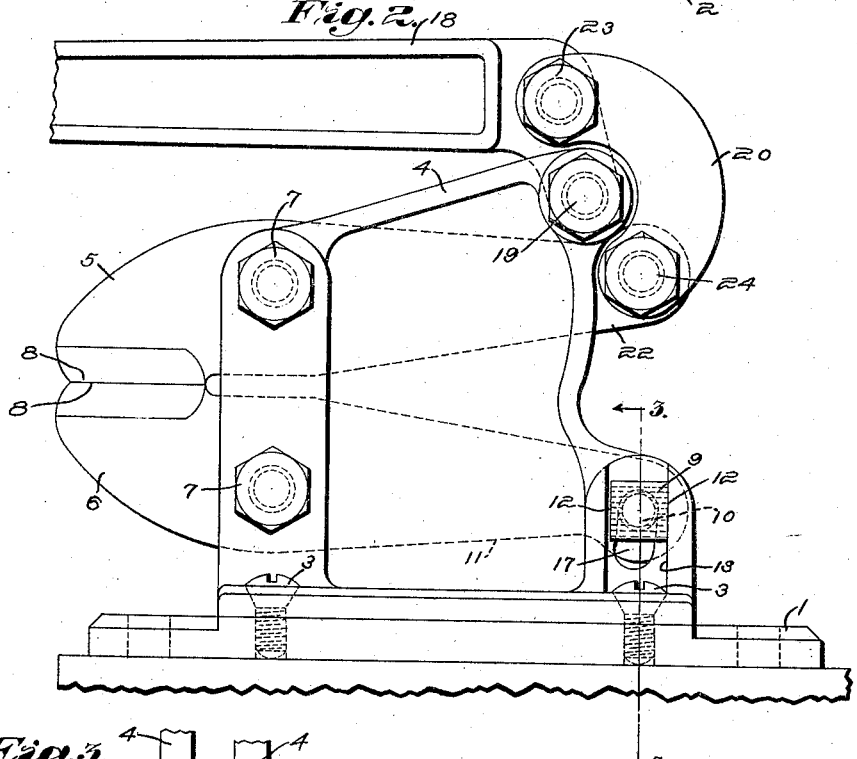
Figure 3:
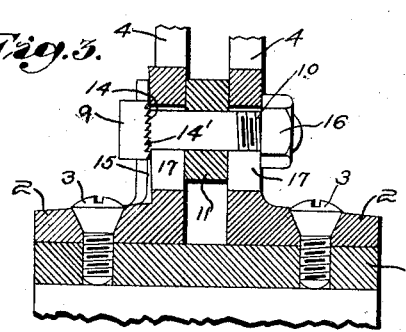

In the accompanying drawings wherein I have shown, merely for illustrative purposes, one embodiment of the invention:

Fig. 1 is a plan view of a cutting tool;
Fig. 2 is a side elevation of the same; and
Fig. 3 is a detail transverse section taken substantially on the line 3—3 of Fig. 2.

The accompanying drawings illustrate the invention as applied to a cutting device of the bench type which desirably includes a base member 1 having superimposed supporting members, herein angle plates 2 secured to said base plate by screws 3. Upstanding portions 4 of the angle plates 2 are placed in spaced relation and mounted between and arranged substantially to fill the space between said upstanding portions are similarly shaped cutting jaws 5 and 6 independently pivotally secured to said angle plates by screws 7 desirably extending through one plate and having screw threaded relation with the other, thus forming supports upon opposite sides of said cutting jaws, although it is to be understood that the invention is not limited to this arrangement.

The cutting jaws 5 and 6 each have a cutting edge 8 arranged in front of the supporting angle members 3 so as to permit the work to be easily and freely inserted. These jaws 5 and 6 are respectively movable and fixed. For example, the cutting jaw 5 is pivotally mounted upon the stud 7 to rock relatively to the cutting jaw 6 which, although mounted upon its stud 7, is normally held against pivotal movement, herein by means capable of permitting predetermined adjusting movements of said relatively fixed cutter jaw 6 to compensate for wear on the cutting edges and joints of said jaws.

Means are herein provided including wedging elements which are effective during the cutting operations to maintain the said lower cutting jaw in predetermined adjusted relation to the movable jaw, said means preferably consisting of a bolt 9 (see Fig. 3) having a body 10 extending through both members 4 of the supporting frame and through the tail 11 of the lower or fixed cutting jaw. The head of the bolt 9 is desirably squared or, at least, provided with flattened opposite faces 12, 12 which work in a groove 13 formed in the outer face of one of the members 4 to prevent rotation of said bolt when its nut is being set up or released. The inner face 14, at least of said head, is desirably inclined to cooperate with a correspondingly inclined surface 15 formed on the adjacent wall of the angle plate 4. These correspondingly shaped surfaces incline outwardly in an upward direction to form wedge means which are effective, when a nut 16 on the bolt 9 is tightened, to prevent upward movement of said bolt and the tail 11 of the lower cutting jaw when pressure is applied to the cutting edge 8 by the operation of the movable cutting jaw 5.

To increase the gripping effect and to reduce the tendency of the bolt 9 to move upwardly under pressure, the face 14 of the head of said bolt is transversely scored or provided with teeth 14' (see Fig. 3), the upper faces of which teeth are substantially straight. The head of said bolt is case hardened so that said teeth will be harder than the metal of the plate 4 against which they are drawn by the nut 16 and, by slightly cutting into said relatively softer metal, the gripping effect will obviously be materially increased.

The holes in the side members 4 through which the bolt 9 extends are desirably elongated to form slots 17 and these slots are desirably curved on an arc swung from the pivotal axis of the lower cutting jaw 6 so as to provide for the adjustment of the cutting jaw tail 11.

By reason of the foregoing construction it will be obvious that inclined surfaces 14 and 15 will, when pressure is applied to the cutting edge 8 of the lower cutting jaw, become more firmly wedged together and hence produce sufficient gripping action to prevent yielding of the adjusting means including said bolt 9.

Any appropriate operating means may be provided for the movable cutting jaw 5 but herein I have provided an operating lever 18 which is pivotally arranged at 19 between the upper portions of the upstanding parts 4 of said angle plates. The handle of said lever 18 herein extends forwardly from said pivot over the cutting jaws 5 and 6, and in convenient position for operation by an operator standing in front of the cutting tool in position to feed work to the cutting jaws.

Means desirably including twin links 20 and 21 arranged upon opposite sides of the cutting lever 18, operatively connect said operating lever with the tail 22 of the movable jaw 5. Said link means may be connected up in any appropriate manner with said elements but herein I provide a bolt 23 connecting the upper ends of the two links 20 and 21 to the lever 18 and a bolt 24 connecting the lower ends of said links with the tail 22 of said movable cutting jaw. It is, however, to be understood that the invention is not limited to the connections between the operating lever and movable jaw herein shown.

To insure a powerful operation of the cutting tool, the screws 19, 23 and 24 are arranged so that their axes are approximately in alignment or, in other words, lie nearly in a common plane when the cutting edges of the cutting jaws 5 and 6 are in contact as will be seen in Fig. 2. This produces a powerful toggle action which will render the cutting tool effective easily to cut substantially all work it is capable of receiving but, in order to allow said connecting screws to assume such aligned relation, the links 20 and 21 are desirably of arcuate formation so as to extend around and clear the portion of the angle plates 4, 4 supporting the screw 19.

Although in the foregoing description, I have disclosed specific means for practicing my invention it is to be understood that the invention is not limited to the means shown.

Claims:

1. A bench cutting tool comprising parallel spaced side members, cutting jaws of substantially equal thickness arranged to lie in the same plane between said side members, toggle means for operating one of said cutting jaws for cutting the work, and means to hold the other jaw in predetermined adjusted relation to the movable cutting jaw.

2. A bench cutting tool comprising a pair of interchangeable cutting jaws, means for pivotally supporting said jaws in cutting relation, and toggle means for effecting the operation of said jaws.

3. In a cutting tool, a pair of cutting jaws, means for supporting said jaws in cutting relation, operating means for said jaws, and means for adjusting the cutting edges of said jaws relatively to each other including a wedge-like surface on said supporting means and a bolt having a toothed and corresponding inclined head portion arranged to prevent movement of one of the cutting jaws during the cutting operation.

4. A cutting tool comprising a base, angle plates superimposed in spaced relation on said base, interchangeable cutting jaws pivotally arranged between said plates, an operating lever pivotally mounted between said plates, and link means operatively connecting said lever with at least one of said cutting jaws.

5. In a bench cutting tool, a pair of substantially parallel angle plates, cutting jaws pivotally mounted between said plates, means for engaging the tail of one of said jaws for maintaining said jaw in a relatively fixed position, said means including an inclined surface on one of said angle plates, a bolt having a correspondingly inclined head surface, teeth formed on the inclined surface of said head to grip the inclined surface on said angle plate, and operating means for the other cutting jaw.

6. A cutting tool comprising a pair of cooperating independently pivoted cutting jaws, a pivoted operating lever for at least one of said jaws, means pivotally to support said cutting jaws and said operating lever on each side, and means adjustably to secure the other cutting jaw in predetermined fixed relation to the movable cutting jaw.

7. A cutting tool comprising a pair of cooperating pivoted cutting jaws of substantially equal thickness arranged in vertical alignment, an operating lever for one of said cutting jaws, supporting plates arranged to support said cutting jaws and said operating lever on each side, and means to hold the other cutting jaw in a predetermined cutting position.

8. A cutting tool comprising a pair of interchangeable independently pivoted cutting jaws arranged in substantial alignment, a pivoted operating lever for one of said cutting jaws arranged to align with said cutting jaws, supporting brackets having substantially parallel members spaced to receive and support said cutting jaws and said operating lever on both sides of each of the aforesaid members, and links arranged on opposite sides of said operating lever and the movable cutting jaw and pivotally connecting said operating lever with said movable cutting jaw, said links being arched to clear the lever-supporting portions of said brackets whereby the axes of the pivots of said links and the pivot of said operating lever may be moved during the final cutting operation into substantial alignment.

9. A cutting tool comprising, in combination, independently pivoted twin cutting jaws arranged to lie in substantial alignment, supporting plates arranged on opposite sides of and pivotally supporting said cutting jaws, an operating lever pivoted between said supporting plates at a point near the free end of one of said jaws, and a pair of links pivotally connecting said operating lever with said last-named cutting jaw, said links being arched to permit the pivotal axes of said links and the pivotal axis of said operating lever to be brought approximately into alignment during the final cutting operation of said jaws.

10. In a cutting tool, substantially parallel side plates, cutting jaws pivotally mounted between and each supported on opposite sides by said side plates, operating means for one of said cutting jaws and means for maintaining the other cutting jaw in a predetermined fixed position including a bolt having a head provided with at least one flattened side, and means formed integral with one of said side plates to engage said flattened side and prevent turning of said bolt when the nut of said bolt is turned.

11. In a cutting tool, substantially parallel side plates, cutting jaws pivotally mounted between and each supported on opposite sides by said side plates, operating means for one of said cutting jaws and means for maintaining the other cutting jaw in a predetermined fixed position including an inclined surface on one of said side plates, a bolt extending through said fixed cutting jaw and said side plates, the head of said bolt having an inclined under surface corresponding with and engaging the inclined surface of said side plates, opposed flattened sides on said head, said side plates having elongated holes to receive said bolt and permit a limited pivotal adjustment of the relatively fixed cutting jaw, and elongated surfaces on one of said side members to engage the flattened sides of said bolt head and prevent turning of said bolt during operations of the nut of said bolt.

In testimony whereof, I have signed my name to this specification.

TYLER C. PORTER.